United States Patent
Farmer et al.

(10) Patent No.: US 8,337,745 B2
(45) Date of Patent: Dec. 25, 2012

(54) INTEGRAL MOLTEN EVACUATION CHANNEL

(75) Inventors: Michael L. Farmer, Elwood, IL (US); Michael R. Riechers, Grant Park, IL (US); Todd A. Henneike, Bourbonnais, IL (US)

(73) Assignee: Illinois Tool Works Inc., Glenview, IL (US)

( * ) Notice: Subject to any disclaimer, the term of this patent is extended or adjusted under 35 U.S.C. 154(b) by 214 days.

(21) Appl. No.: 12/781,303

(22) Filed: May 17, 2010

(65) Prior Publication Data

US 2010/0330314 A1    Dec. 30, 2010

Related U.S. Application Data

(60) Provisional application No. 61/221,413, filed on Jun. 29, 2009.

(51) Int. Cl.
*B29C 45/17* (2006.01)
*B29C 45/37* (2006.01)

(52) U.S. Cl. ............................. 264/572; 264/328.12

(58) Field of Classification Search .............. 264/572, 264/328.12

See application file for complete search history.

(56) References Cited

U.S. PATENT DOCUMENTS

| | | | | |
|---|---|---|---|---|
| 5,308,574 A | * | 5/1994 | Yamazaki et al. | 264/572 |
| 5,423,667 A | * | 6/1995 | Jaroschek | 264/572 |
| 5,759,479 A | * | 6/1998 | Gotterbauer | 264/572 |
| 5,948,347 A | * | 9/1999 | van Jaarsveld et al. | 264/572 |
| 5,968,446 A | * | 10/1999 | Shimobayashi et al. | 264/572 |
| 6,037,038 A | * | 3/2000 | Kuhr | 428/188 |
| 6,576,170 B1 | | 6/2003 | Nunnery et al. | |
| 6,953,546 B2 | * | 10/2005 | Pearson | 264/572 |
| 2008/0164640 A1 | * | 7/2008 | Pruitt et al. | 264/513 |

FOREIGN PATENT DOCUMENTS

| | | |
|---|---|---|
| DE | 10 2005 026 825 | 6/2006 |
| JP | 08244062 | 9/1996 |

OTHER PUBLICATIONS

International Search Report and Written Opinion for PCT/US2010/035708.

Jaroschek C: "Internal Gas Pressure for Expelling Excess Melt" European Production Engineering, 171991 1, vol. 15, No. 1, Mar. 1, 1991, pp. 9-10,12, XP000287284 ISSN: 0940-2470 p. 12, Left-Hand Column, Paragraph 3—p. 12, Right-Hand Column, Last Paragraph.

* cited by examiner

*Primary Examiner* — Jill Heitbrink
(74) *Attorney, Agent, or Firm* — Mark W. Croll; Paul F. Donovan

(57) ABSTRACT

A plastic part is formed with a hollow portion and an integral evacuation channel extending from the hollow portion to a gate at which plastic for the part was injected. During the injection molding process for the part, the channel and portion to be hollowed are filled with molten plastic, and a gas is injected into the portion to be hollowed to force molten material from the portion to be hollowed back through the channel.

15 Claims, 4 Drawing Sheets

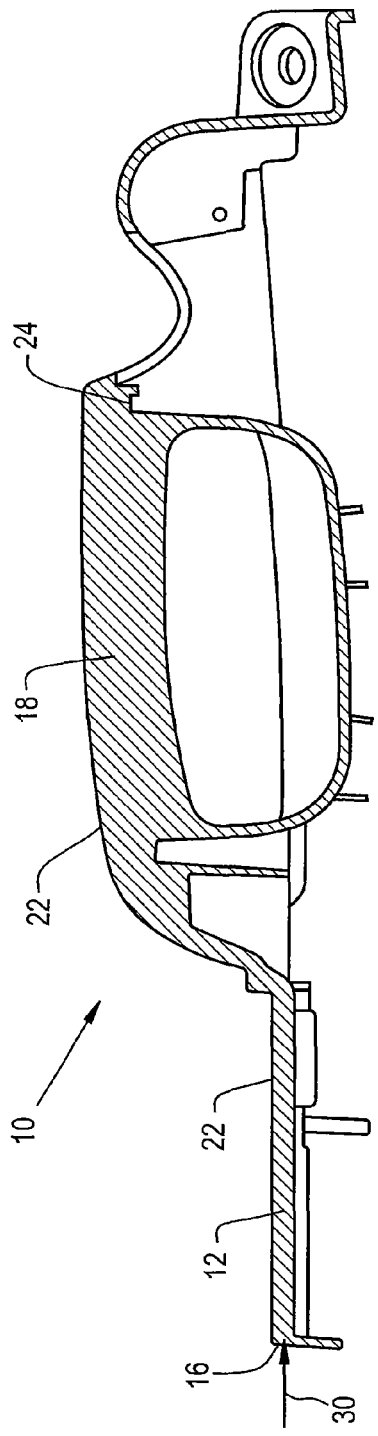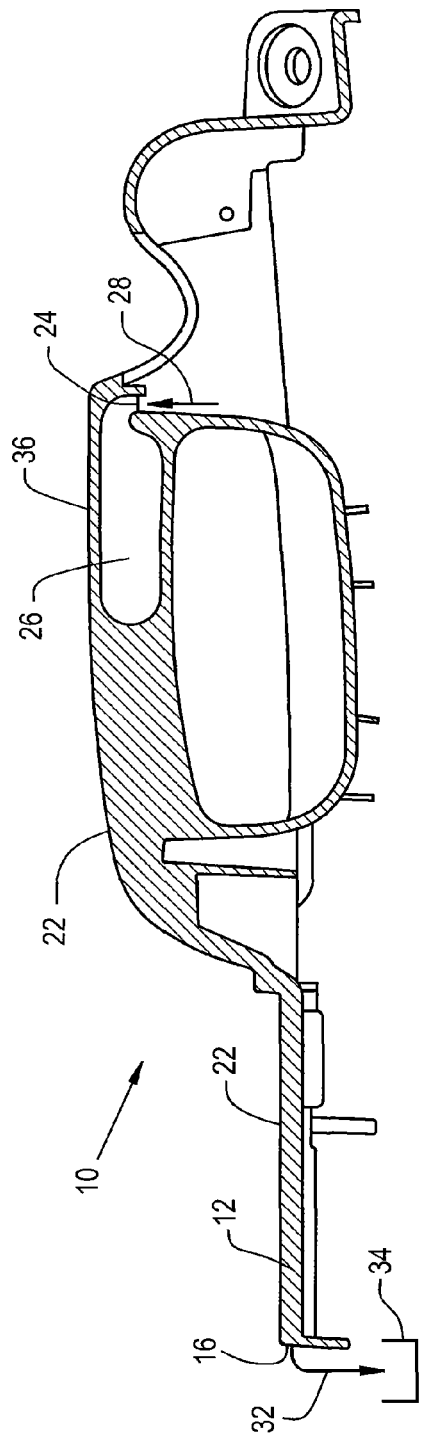

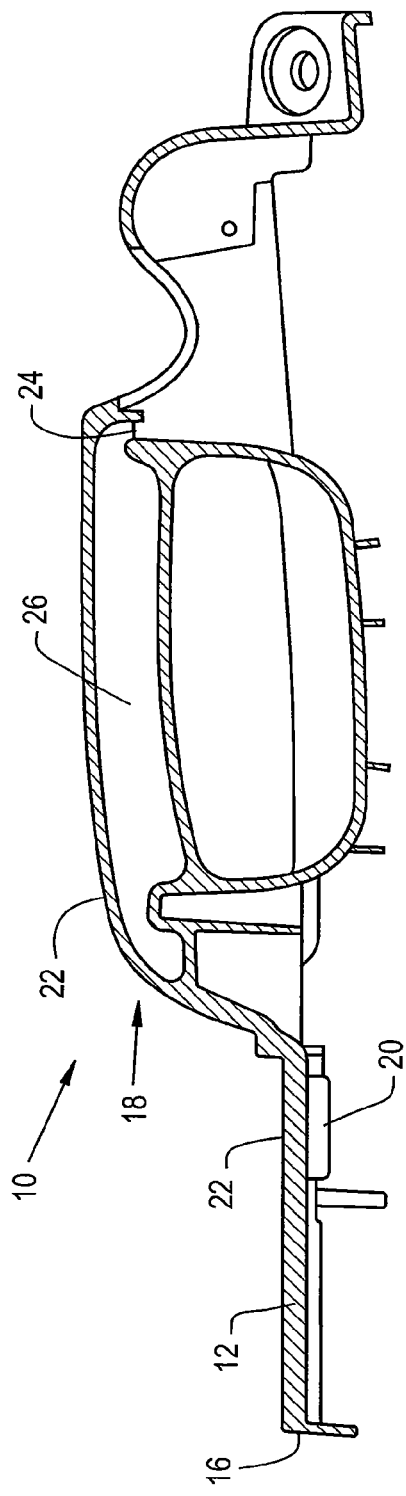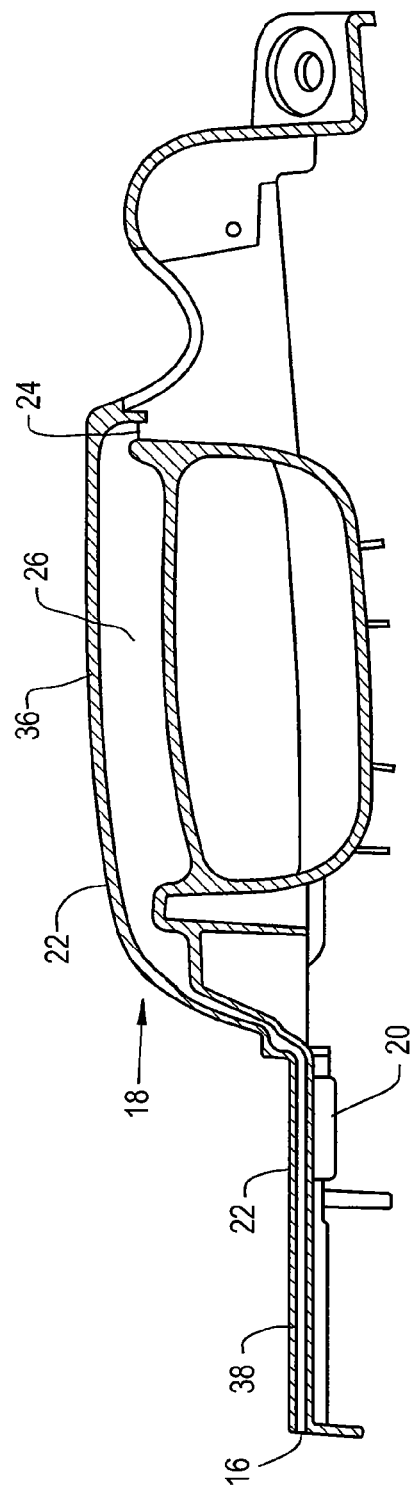

INTEGRAL MOLTEN EVACUATION CHANNEL

CROSS-REFERENCE TO RELATED APPLICATIONS

The present application claims the benefits of U.S. Provisional Application Ser. No. 61/221,413 filed Jun. 29, 2009.

FIELD OF THE INVENTION

The present invention relates generally to processes for injection molding plastic components and to the components made thereby. More specifically, the invention pertains to molding process to manufacture parts with minimal surface blemishes such as divots, sinks, flow lines or the like. Still further, the invention pertains to injection molded parts and methods for making the parts to minimize weight while maintaining or improving strength by creating voids and hollows in the part.

BACKGROUND OF THE INVENTION

Molded plastic parts are used extensively in many products and assemblies. As known to those skilled in the art, maintaining relative consistency in thickness can improve surface finish. So called "divots" or "sinks" can be formed in a surface opposite to an extension or projection. In some situations the presence of a surface divot or sink is of no consequence. However, when surface finish is important, a sink or divot may be unacceptable. Hollowing the interior of a large or thick part can avoid the formation of a sink or divot by establishing greater consistency in thickness of the part along the visible surface for which surface finish is important.

Hollowing a part also reduces the weight of the part, which can be important and advantageous for a part that is lifted, moved or otherwise manipulated during use. Hollowing a part can also improve strength by establishing an interior surface for the molded part, which improves overall strength of the part.

Automobile door handle assemblies can take advantage of the aforementioned qualities, including improved surface finish, reduced weight and improved strength achieved by hollowing thicker portions of the handle components. Processes to hollow some types of parts, including vehicle door handle components, have met with some success; however the processes have not always been efficient or consistent. In some processes, hollowing is achieved by injecting an inert gas, such as nitrogen, into the still molten material through a gas inlet and forcing or displacing an interior volume of the still-molten material through an evacuation site. Locating the gas injection site and the molten material evacuation site can be difficult. Localized curing or hardening can block the injection and evacuation sites. In some processes, multiple gas injection sites or material evacuation sites have been needed. As a result, hollowing can be inconsistent, leading to finished surface irregularities, parts with localized weaknesses or parts with uneven weight distributions.

In a variation of the aforedescribed gas injection evacuation process, sometimes referred to as a "short shot" process, molten material is injected to partially fill the mold, followed by a shot of injected inert gas to create a hollow in the material of the first shot. This is then followed by another shot of molten material to further fill the mold, with an additional shot of the inert gas to hollow the second portion of filled material. This variation can lead to further irregularities as cooling occurs along the interface between shots of molten material, and cooling also can cause the material to pull away from the tool surface, thereby creating other types of surface irregularities.

Accordingly, a process to produce hollowed parts of injection molded plastic that provides design flexibility, consistency and improved surface finish will provide advantages.

SUMMARY OF THE INVENTION

An injection molded part is shaped with an enlarged area extending from the gate or plastic injection site to an area of the part that is to be hollowed. The enlarged area maintains a central core of molten material until injection is complete. Thereafter, an inert gas is injected into the intended hollowed area, and the still-molten material is forced back through the plastic injection site. Since outer curing will occur, a tube-like channel is formed integral in the part.

In one aspect of one form described herein an injection molding process is provided with steps of injecting molten plastic through a gate to form an article; advancing the molten plastic to a remote region of the article that is intended to be hollow; filling the remote region with molten plastic; establishing an enlarged channel of molten plastic extending continuously from the gate to the remote region; maintaining a molten condition of the plastic in the center of the remote region and in a continuous core of the channel from the remote region to the gate; injecting a gas into the remote region and displacing the molten plastic in the center of the remote region back toward the gate through the channel; and solidifying the plastic remaining after said step of injecting a gas.

In another aspect of a form described herein, a plastic article formed by injection molding plastic is provided with a body including a hollow portion and an enclosed molten plastic evacuation channel formed along a surface of the body. The enlarged channel extends continuously from the hollow portion to an injection gate through which plastic of the article was injected. The channel is superfluous to use of the completed part.

In a further aspect of a form described herein, an injection molding process is provided with steps of injecting molten material through a gate to form an article; forming a hollow portion in the article by injecting a gas into the article and forcing still molten material back through the gate; and hardening the remaining molten material.

Other features and advantages of the invention will become apparent to those skilled in the art upon review of the following detailed description, claims and drawings in which like numerals are used to designate like feature.

BRIEF DESCRIPTION OF THE DRAWINGS

FIG. 4 is a cross-sectional view of the part during a stage of manufacture;

FIG. 5 is a cross-sectional view of the part during a later stage of manufacture than that shown in FIG. 4;

FIG. 6 is a cross-sectional view of a completed part; and

FIG. 7 is a cross-sectional view of another embodiment of a completed part.

Figure 1:
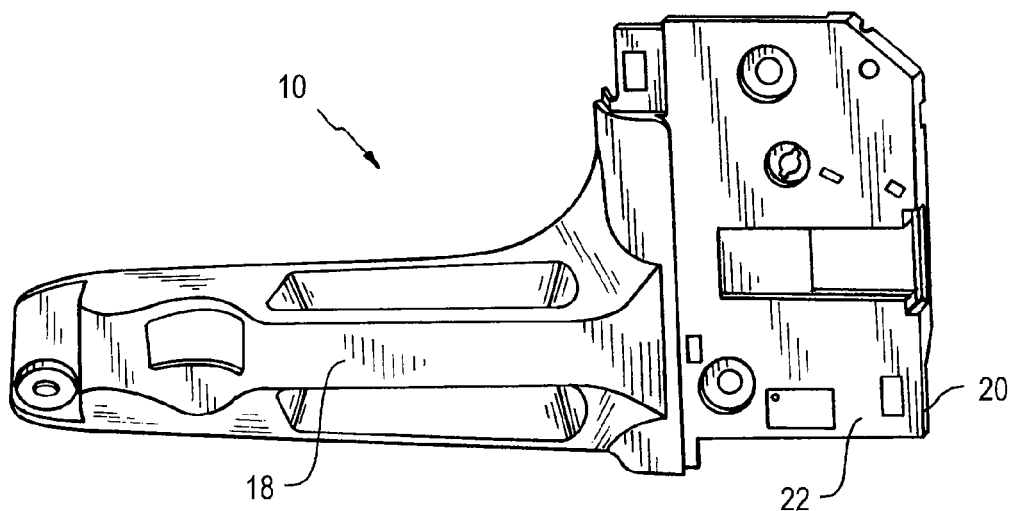
FIG. 1 is a perspective view of a plastic part having been formed with an integrated molten evacuation channel.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Figure 2:
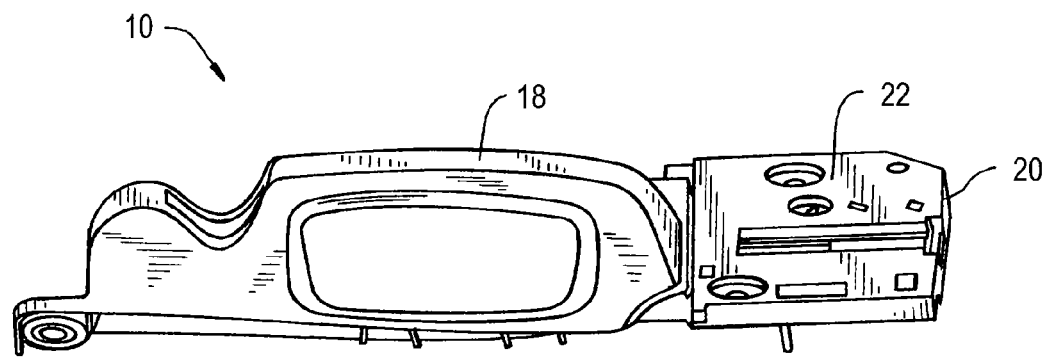
FIG. 2 is a perspective view of the part from another angle.
Figure 3:
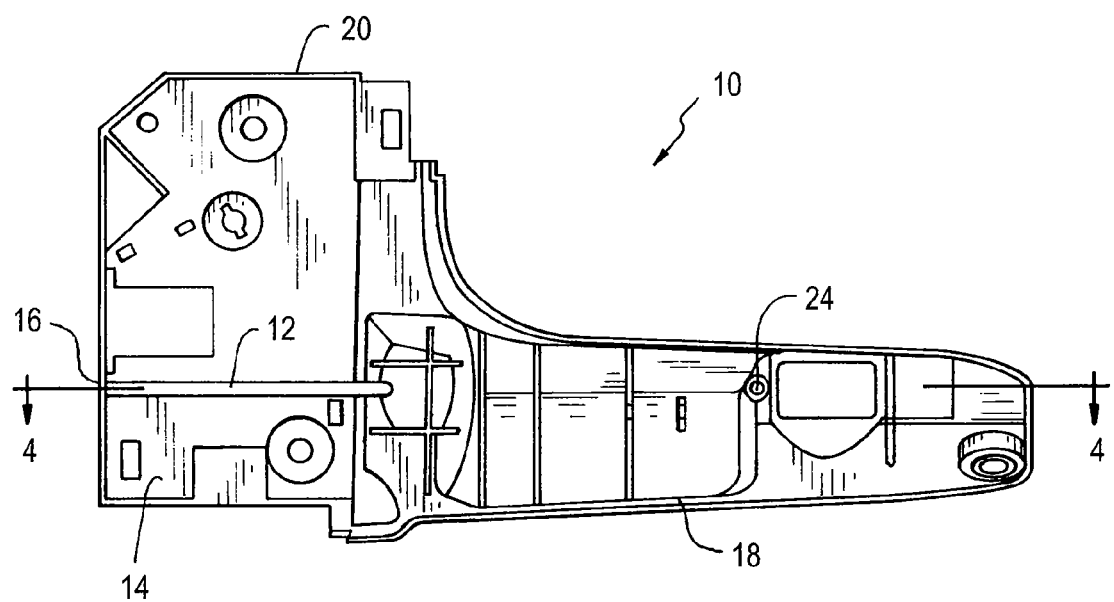
FIG. 3 is a plan view of the part.

Referring now more particularly to the drawings and to FIGS. 1-3 in particular, a plastic article, and more specifically, a completed vehicle door handle part 10 is shown, including an integral evacuation channel 12 (FIG. 3) formed as an enclosed enlargement standing proud of a back surface 14 of the part and extending along an inconspicuous and inconsequential area of the part. Integral evacuation channel 12 extends continuously from a gate or plastic injection site 16 to a remote structural portion or region 18 of part 10 that is molded solid initially, but is hollow in the completed part.

Door handle part 10 includes a plate-like, relatively thin body portion 20 of which surface 14 is the back thereof and a styling surface 22 is the front thereof. Body portion 20 is formed integrally with hollowed region 18 during an injection molding process. Door handle part 10 shown and described herein is merely an exemplary application for the use of an integral evacuation channel, and it should be understood that an integral evacuation channel as described herein can be used for other types of plastic articles made by injection molding, to hollow out portions or all of the article thus made.

Those skilled in the art will readily understand the way in which a mold cavity can be designed and constructed to provide an injection molded object having the structural features described herein. Accordingly, the features of the part during and after the injection molding process will be described. The integral evacuation channel provides a pipe of material added to the part design that begins at the gate and follows a path directed to an end of the area to be hollowed before the part is completed. In the completed part, the channel may be solid or hollow, as will be described.

Integral evacuation channel 12 is formed along an inconspicuous region of part 10, as a continuous, ridge-like enlargement from gate 16 to hollowed region 18. Accordingly, integral evacuation channel 12 follows along the contour of the back surface 14 of body portion 20, and is provided of consistent cross-section through out its length. Integral evacuation channel 12 is formed of sufficient size so that a center core thereof remains molten throughout the process to be described herein, even as peripheral regions at the outer surface thereof may harden. Integral evacuation channel 12 can be provided to strengthen and stiffen the areas along which it extends, such as body portion 20, or can be superfluous to the final structure and performance of the part.

A gas injection site 24 is provided in remote region 18 at an opposite end of a to-be-formed hollow zone 26 from a juncture 24 of integral evacuation channel 12 and the to-be-formed hollow zone 26. A source of pressurized gas, indicated in the drawings as arrow 28, is provided to the mold so as to inject pressurized gas into part 10 at gas injection site 24.

In the process of molding part 10, molten plastic designated by arrow 30 is injected through the plastic injection gate 16 and flows along the area of the mold to form enlarged integral evacuation channel 12 and otherwise to fill the tool and complete the part. The size and configuration of integral evacuation channel 12 maintains a central core thereof in a molten state through out the plastic injection step even as peripheral areas thereof may harden. Upon completion of the plastic injection step, integral evacuation channel 12 is a continuous material ridge, completely filled with molten material that may be partially solidified along the outer surface thereof. The condition of part 10 at completion of molten plastic injection is shown in FIG. 4.

When the tool has been completely filled with molten plastic, a suitable gas, such as nitrogen from gas source 28, is injected through the gas injection site 24. The injected nitrogen forces molten material from remote region 18, to thereby begin and expand the formation of hollow zone 26. The still molten core of remote region 18 is forced back through integral evacuation channel 12, with the gas and evacuated molten plastic, designated by arrow 32, accumulating in a well 34. It should be understood that the step of injecting gas is coordinated with elapsed time and the solidifying characteristics of the molten material so that hardened or partially hardened boundary 36 is formed defining hollow zone 26 as the molten material at the core thereof is pushed out. A similar phenomenon occurs in integral evacuation channel 12 such that an outer boundary 38 is formed even as the core thereof remains molten and movable. Accordingly, a self forming evacuation channel is provided through which the inert gas forces the excess molten material to create hollow zone 26. The inert gas pumped through the part forces out material to form hollow zone 26, and, by completely filling the hollow zone under pressure, the gas urges the remaining material against the tool surface as the remaining material continues to cure. Improved surface finishes are achieved in that shrinkage away from the mold surface is reduced.

FIG. 5 illustrates part 10 at an intermediate time during the formation of hollow zone 26. The hollow zone has been initiated and is expanding away from gas injection site 24 as the still molten core within region 18 is forced back through integral evacuation channel 12. Hollow zone 26 continues to expand to the desired size, and the step of injecting gas can be terminated when hollow zone 26 is complete. FIG. 6 illustrates part 10 with hollow zone 26 complete but evacuation channel 12 remaining full of molten plastic. The plastic is allowed to harden and cure, and the part is complete. Alternatively, the step of injecting gas can be continued until the molten core of channel 12 is also removed. The embodiment with a hollow channel 12 is illustrated in FIG. 7.

Initially, channel 12 provides a path through which molten plastic flows into the mold cavity and disperses throughout the part geometry typical to standard injection molding processes. Upon completion of the molten plastic fill, the channel is a completely filled ridge that stands prominent of the surface of the part and is continuous from the gate to the remote region to be hollowed. After the fill with plastic is complete, nitrogen gas is injected into the part near the desired hollowed area to be formed. The pressurized gas begins molten material displacement within the remote region of the part. The molten material flows in the direction of a localized pressure drop caused by way of the integral evacuation channel, which because of its geometry allows the center of the channel to remain in a molten state even while adjacent geometry has settled into a solid state. Molten material and the injected gas follow the evacuation channel out via the gate.

The channel allows for targeted portions of part 10 to be hollowed by filling with gas. Accordingly, weight can be reduced and strength improved together with better surface characteristics on the molded component due to the interior pressurization of the hollowed region.

Without a dedicated integral evacuation channel, it is difficult to target specific areas of many parts without adversely affecting the styling surface of the part. Further, without the dedicated evacuation channel, it is difficult to remove molten material from desired areas without adversely impacting the styling surface of the part. Accordingly, greater flexibility is provided in designing parts with improved surface characteristics, low weight and improved strength through the process of hollowing the part. By providing a dedicated evacuation channel, evacuation can be performed even across otherwise thin part areas through the thicker part defined by the evacuation channel. Without the channel, it is not possible to push molten material from a thick section into a restricted thin section to expel the molten plastic. Other known evacuation methods can not target localized areas in an effective manner, and in many cases can not target interior areas at all. Unwanted surface flow lines in the styling surface, which would otherwise be caused by melt flow in short shot gas methods, are eliminated. The channel also controls the flow of nitrogen gas, keeping it on track and thereby preventing it from spreading into unwanted areas, causing aesthetic and mechanical failures. The use of a dedicated evacuation channel allows material expulsion to be located further from the gas injection site, thereby reducing tool complexity and costs associated therewith.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. An injection molding process, comprising steps of:
   injecting molten plastic through a gate to form an article;
   advancing the molten plastic to a remote region of the article that is intended to be hollow;
   filling the remote region with molten plastic;
   forming a further portion of the article integral with the remote region, between the remote region and the gate, the further portion not intended to be hollow;
   establishing an enlarged channel of molten plastic extending along the not intended to be hollow further portion of the article, the enlarged channel extending continuously from the gate to the remote region and spanning the not intended to be hollow further portion;
   maintaining a molten condition of the plastic in the center of the remote region and in a continuous core of the channel from the remote region to the gate;
   injecting a gas into the remote region and displacing the molten plastic in the center of the remote region back toward the gate through the channel; and
   solidifying the plastic remaining after said step of injecting a gas.

2. The injection molding process of claim 1, further including terminating said step of injecting a gas when the remote region is hollow and the channel remains filled; and thereafter allowing the molten material in the channel to solidify during said step of solidifying.

3. The injection molding process of claim 2, including maintaining an elevated pressure of the gas in the remote region while solidifying the remaining plastic.

4. The injection molding process of claim 3, said step of injecting a gas performed by injecting nitrogen.

5. The injection molding process of claim 1, further including continuing said step of injecting a gas a sufficient time for hollowing the remote region and emptying a center core of the channel.

6. The injection molding process of claim 5, including maintaining an elevated pressure of the gas in the remote region while solidifying the remaining plastic.

7. The injection molding process of claim 6, said step of injecting a gas performed by injecting nitrogen.

8. The injection molding process of claim 1, said step of injecting a gas performed by injecting nitrogen.

9. An injection molding process, comprising steps of:
   injecting molten material through a gate to form an article having a first portion and a second portion integral with each other;
   establishing a continuous ridge on and standing proud of a surface of the second portion and extending continuously from the gate to the first portion by spanning the second portion;
   forming a hollow in the first portion in the article by injecting a gas into the article and forcing still molten material back through the gate by way of the continuous ridge without forming a hollow in the second portion; and
   hardening the remaining molten material in the first portion, second portion and continuous ridge.

10. The injection molding process of claim 9, including pressurizing the interior of the hollow portion while hardening the remaining material.

11. The injection molding process of claim 10, including hollowing a continuous channel through the continuous ridge from the hollow in the first portion to the gate.

12. The injection molding process of claim 11, said injecting a gas performed by injecting nitrogen.

13. The injection molding process of claim 11 including pressurizing the continuous channel while hardening the remaining material.

14. The injection molding process of claim 13, said injecting a gas performed by injecting nitrogen.

15. The injection molding process of claim 9, including hollowing the ridge during said forming step.

* * * * *